United States Patent [19]
Schröder et al.

[11] Patent Number: 5,682,432
[45] Date of Patent: Oct. 28, 1997

[54] BROADCAST RECEIVER

[75] Inventors: Ernst F. Schröder, Hanover; Jens Spille, Laatzen, both of Germany

[73] Assignee: Deutsche Thomson-Brandt GmbH, Villigen-Schwenningen, Germany

[21] Appl. No.: 148,147

[22] Filed: Nov. 5, 1993

[30] Foreign Application Priority Data

Nov. 19, 1992 [DE] Germany .............. 42 38 882.1

[51] Int. Cl.$^6$ ............................................. H04H 5/00
[52] U.S. Cl. .................................... 381/13; 381/106
[58] Field of Search ................ 381/13, 106; 455/72, 455/12.1

[56] References Cited

U.S. PATENT DOCUMENTS

| | | | |
|---|---|---|---|
| 4,025,723 | 5/1977 | Blackledge | 381/106 |
| 4,701,953 | 10/1987 | White | 381/106 |
| 4,809,328 | 2/1989 | Usui et al. | 381/13 |
| 5,278,912 | 1/1994 | Waldhauer | 381/68.4 |

FOREIGN PATENT DOCUMENTS 4004576  2/1991  Germany .............. H04H 1/00

Primary Examiner—Edward L. Coles, Sr.
Assistant Examiner—Stephen Brinich
Attorney, Agent, or Firm—Joseph S. Tripoli; Frederick A. Wein

[57] ABSTRACT

In a broadcast receiver, a dynamic compression of the signal is switched on or off in dependence on whether such a compression has been carried out at the transmitting end. An identification bit is transmitted for identifying this compression at the transmitter end. The object is to create a broadcast receiver which effects automatic switching-on or switching-off of an amplitude compression but manages without a transmitted identification bit. The received audio signal is applied to a signal analysing circuit which determines the scale factors of the signal and generates switching voltages dependent on the scale factors. The present invention has particular applicability for broadcast receivers in a motor vehicle or with subsequent signal recording.

6 Claims, 1 Drawing Sheet

BROADCAST RECEIVER

BACKGROUND

The invention is based on a broadcast receiver according to the precharacterizing clause of claim 1. Such a broadcast receiver is known from German Offenlegungsschrift 40 04 576.

The result of a compression and expansion of an audio signal is that the signal amplitudes of the quietest passages are above the noise level and those of the loudest passages do not exceed the modulation range. In this connection, it is known to transmit, in addition to the audio signal, a control signal which informs the receiver on the type and magnitude of the compression performed at the transmitter end. The receiver can then perform an expansion according to the compression at the transmitter end in order to compensate for the compression and ensure faithful sound reproduction. Thus, means are necessary for informing the receiver at the transmitter end whether compression has taken place at all and about the type and magnitude of the compression. This results in additional complexity. In this connection, it is also known to set a bit in a datastream, for example an RDS datastream, which informs the receiver whether a dynamic compression has been carried out at the transmitter end.

OBJECTS OF THE PRESENT INVENTION

The invention is based on the object of creating a broadcast receiver of the type described which can detect the presence of a compression at the transmitter end but manages without the said precompression bit.

A significant advantage of the invention consists in being able to dispense with the transmission of the precompression bit and thus cost and work is saved at the transmitter end. In addition, errors due to accidental setting or non-setting of the bit at the transmitting end are avoided because the switchover at the receiver end no longer depends on a transmitted identification signal but is controlled from the audio signal itself. The switching variable can be a switching voltage or also a switching current.

Thus, it is not an identification signal which is evaluated but the received audio signal itself which is analysed in the invention. In this analysis, the scale factor of the audio signal is utilized for determining whether a compression of the audio signal has been carried out at the transmitter end or not. The receiver can then carry out the corresponding measures from the signal itself after a short evaluation time. When the receiver detects that compression has taken place at the transmitter end, it will, as a rule, not carry out any further compression or only a slight compression. When the receiver detects a compression at the transmitting end, it will automatically switch on a compression of the signal or switch an already existing compression to a higher value. Such a compression at the receiver end is advantageous, for example, for increasing the signal-to-noise ratio when the signal is also to be recorded with a recorder. Such later compression is also necessary in a car radio in order to ensure the intelligibility and the quality of the sound reproduction.

The scale factor is a factor typical of the signal, which classifies the peak values of sub-band signal levels within a particular time interval and determines for the transcoding of each sub-band signal its resolution within the time interval. Such scale factors, their meaning and function are described in greater detail in European Patent Specification 0 290 581.

BRIEF DESCRIPTION OF THE DRAWING

In the text which follows, the invention will be explained in greater detail with reference to the drawing, in which the figure shows the block diagram of a broadcast receiver according to the invention in simplified form.

DETAILED DESCRIPTION OF THE PREFERRED EMBODIMENT

Figure 1:
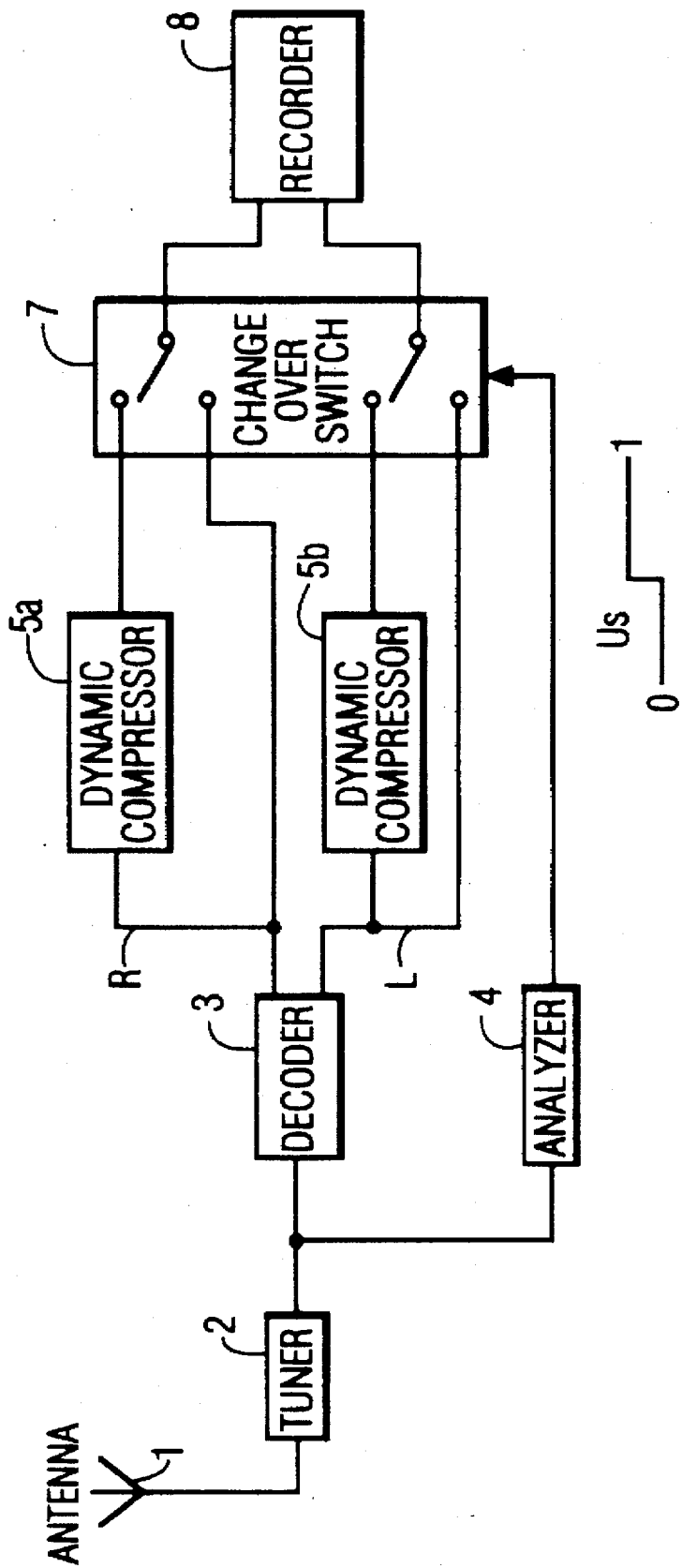

Using the antenna 1, a sterophonic broadcast signal is received, the two audio signals of which for the right-hand and left-hand sound channel are optionally subjected or not subjected to dynamic compression at the transmitter end. The received signal is processed in the tuner 2 and supplied to the decoder 3 which delivers the two audio signals R for the right-hand sound channel and L for the left-hand sound channel or also the L+R and L−R signals. These signals are supplied to the recorder 8 for recording. If no dynamic compression has yet been performed in the signal at the transmitter end, a signal compression is necessary or advantageous in the recording with the recorder 8. If dynamic compression has already been carried out at the transmitter end, further compression at the receiver end would be superfluous or even disadvantageous.

The signal from the output of tuner 2 is now additionally supplied to the analysing circuit 4. The circuit 4 also decodes the signal and determines the respective so-called scale factor. Depending on the scale factor, the switching voltage Us is generated which passes as switching voltage to the change-over switch 7. When the analysing circuit 4 finds by means of the scale factors that no compression has yet been performed at the transmitting end, it generates a switching voltage having the value 0 which places the change-over switch 7 into its above position. As a result, the dynamic compressors 5a and 5b are inserted into the signal paths for R and L. These effect a dynamic compression of signals R and L for the recording in order to improve by this means the signal-to-noise ratio during replay.

When it is found in the analysing circuit 4 by means of the scale factors that dynamic compression has already been carried out at the transmitting end, the switching voltage Us assumes the value 1. As a result, the change-over switch 7 is switched to its lower position. The compressors 5a and 5b are then switched off so that no additional compression of the signals R and L is carried out in required manner in the receiver. The scale factor and circuits for implementing the analysing circuit 4 are described in greater detail in U.S. Pat. No. 4,972,484, which is expressly incorporated by reference herein.

What is claimed is:

1. A receiver of a transmitted audio signal which is optionally subjected to dynamic compression at the transmitting end, comprising;

means for deriving a switching variable from the received signal, means for automatically switching a compression operation on or off in response to the switching variable, and said means for deriving including signal analyzing means for analyzing the received audio signal for determining scale factors of the signal and generating the switching variable depending on the scale factors, the received sound signal being digitally represented by a multiplicity of spectral sub-band signals with time-discrete quantized sample values being present for each sub-band signal, and the scale factors being determined for each digitized sub-band signal, the scale factors classifying the peak value of the sub-band signal level within a particular time interval.

2. The receiver according to claim 1, further comprising:

a decoder for decoding digitally coded audio signals, the scale factor being used during the decoding of the received coded sub-band signal at the receiver for reconstructing the original sub-band signal, the receiver containing an evaluating unit for evaluating the scale factors which determine whether the transmitted sound signals are compressed at the transmitting end.

3. Receiver according to claim 2 wherein the receiver has a compression device for the dynamic compression of a digitally coded received audio signal, the compression device providing dynamic compression of the received audio signal when the received audio signal has not been compressed at the transmitting end with the lack of compression at the transmitting end being detected by the receiver.

4. A Receiver of a transmitting audio signal which is optionally subjected to dynamic compression at the transmitting end, comprising;

means for deriving a switching variable from the received signal, means for automatically switching a compression operation on or off in response to the switching variable, said means for deriving including signal analyzing means for analyzing the received audio signal for determining scale factors of the signal and generating the switching variable depending on the scale factors, a decoder for decoding digitally coded audio signals, the received sound signal being digitally represented by a multiplicity of spectral sub-band signals with time-discrete quantized sample values being present for each sub-band signal, and the scale factors being determined for each digitized sub-band signal, the scale factors classifying the peak value of the sub-band signal level within a particular time interval, the scale factor being used during the decoding of the received coded sub-band signal at the receiver for reconstructing the original sub-band signal, the receiver containing an evaluating unit for evaluating the scale factors which determine whether the transmitted sound signals are compressed at the transmitting end.

5. Receiver according to claim 4 wherein the receiver has a compression device for the dynamic compression of a digitally coded received audio signal, the compression device providing dynamic compression of the received audio signal when the received audio signal has not been compressed at the transmitting with the lack of compression at the transmitting being detected by the receiver.

6. A receiver of a transmitted audio signal which is optionally subjected to dynamic compression at the transmitting end, comprising;

means for deriving a switching variable from the received signal, means for automatically switching a compression operation on or off in response to the switching variable, said means for deriving including signal analyzing means for analyzing the received audio signal for determining scale factors of the signal and generating the switching variable depending on the scale factors, a decoder for decoding digitally coded audio signals, the received sound signal being digitally represented by a multiplicity of spectral sub-band signals with time-discrete quantized sample values being present for each sub-band signal, the scale factors being determined for each digitized sub-band signal, the scale factors classifying the peak value of the sub-band signal level within a particular time interval, the scale factor being used during the decoding of the received coded sub-band signal at the receiver for reconstructing the original sub-band signal, the receiver containing an evaluating unit for evaluating the scale factors which determine whether the transmitted sound signals are compressed at the transmitting end, the receiver having a compression device for the dynamic compression of a digitally coded received audio signal, the compression device providing dynamic compression of the received audio signal when the received audio signal has not been compressed at the transmitting end with the lack of compression at the transmitting end being detected by the receiver.

\* \* \* \* \*